(No Model.) 5 Sheets—Sheet 1.
H. F. BROWN.
ORE ROASTING FURNACE.
No. 471,264. Patented Mar. 22, 1892.
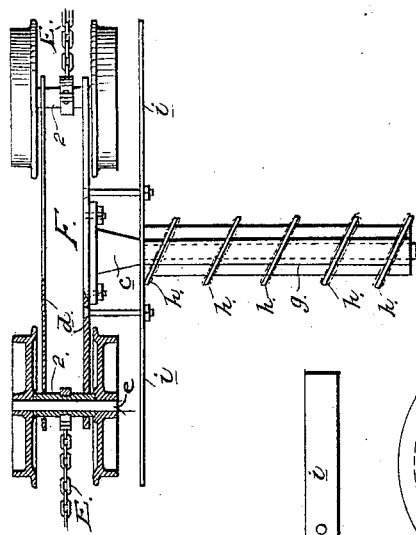
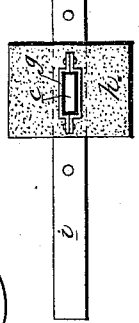
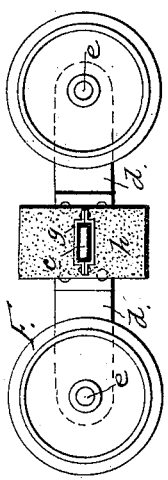
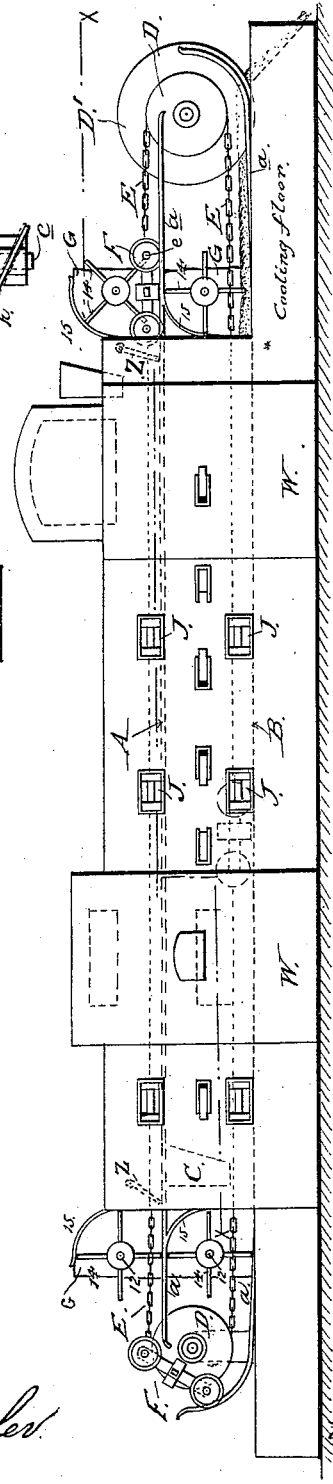
WITNESSES
Chapman Fowler
M. M. Evans
INVENTOR
Horace F. Brown,
by A. H. Evans & Co.
Attorneys

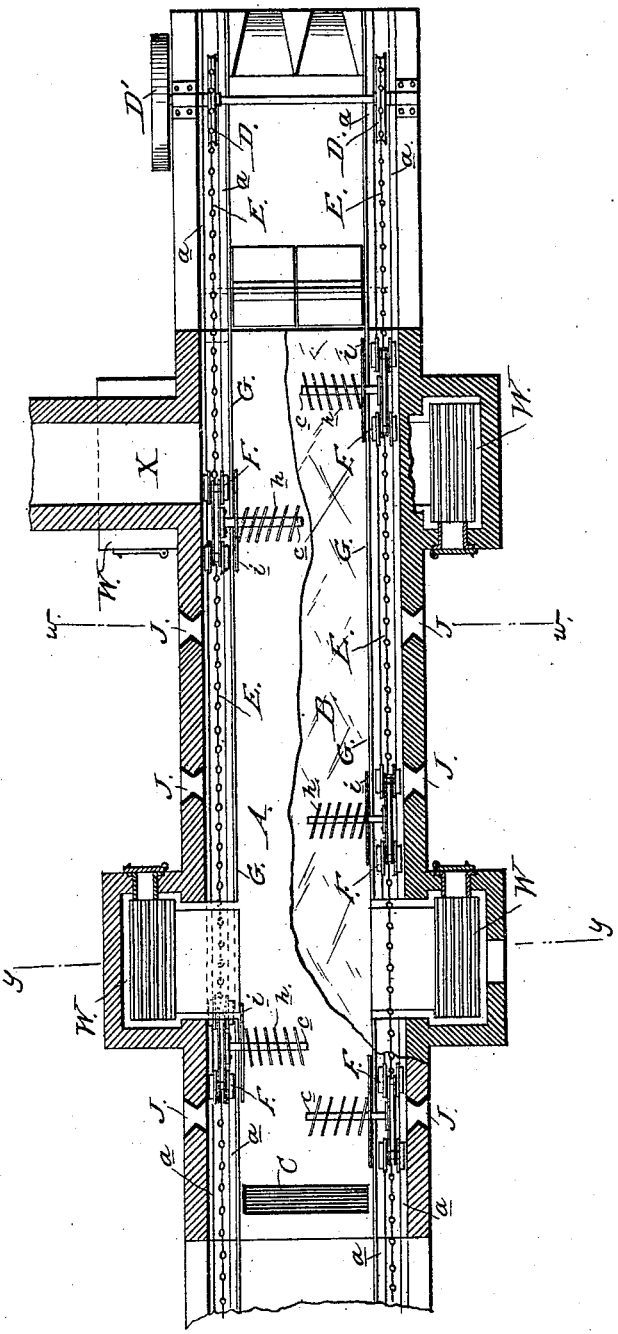

(No Model.)  H. F. BROWN.  5 Sheets—Sheet 3.
ORE ROASTING FURNACE.

No. 471,264. Patented Mar. 22, 1892.

WITNESSES
Chapman Fowler
M. M. Evans

INVENTOR
Horace F. Brown,
by A. H. Evans & Co.
Attorneys

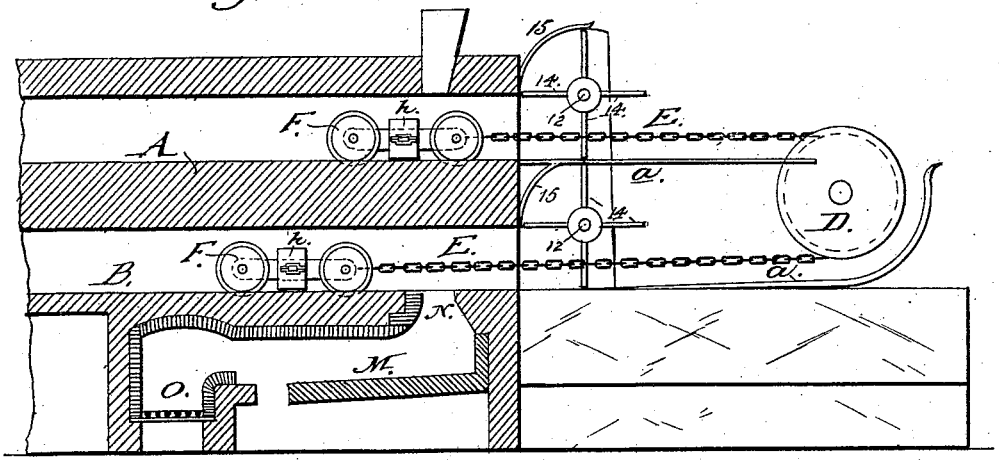

(No Model.) 5 Sheets—Sheet 5.

H. F. BROWN.
ORE ROASTING FURNACE.

No. 471,264. Patented Mar. 22, 1892.

WITNESSES
Chapman Fowler
M. M. Evans

INVENTOR
Horace F. Brown,
by A. H. Evans & Co.
Attorneys

THE NORRIS PETERS CO., PHOTO-LITHO., WASHINGTON, D. C.

UNITED STATES PATENT OFFICE.

HORACE F. BROWN, OF BUTTE CITY, MONTANA, ASSIGNOR TO MARY C. BROWN, OF SAME PLACE.

ORE-ROASTING FURNACE.

SPECIFICATION forming part of Letters Patent No. 471,264, dated March 22, 1892.

Application filed August 14, 1891. Serial No. 402,619. (No model.)

*To all whom it may concern:*

Be it known that I, HORACE F. BROWN, a citizen of the United States, residing at Butte City, in the county of Silver Bow and State of Montana, have invented certain new and useful Improvements in Ore-Roasting Furnaces, as set forth in the accompanying drawings, forming part of this specification, in which—

Figure 3:
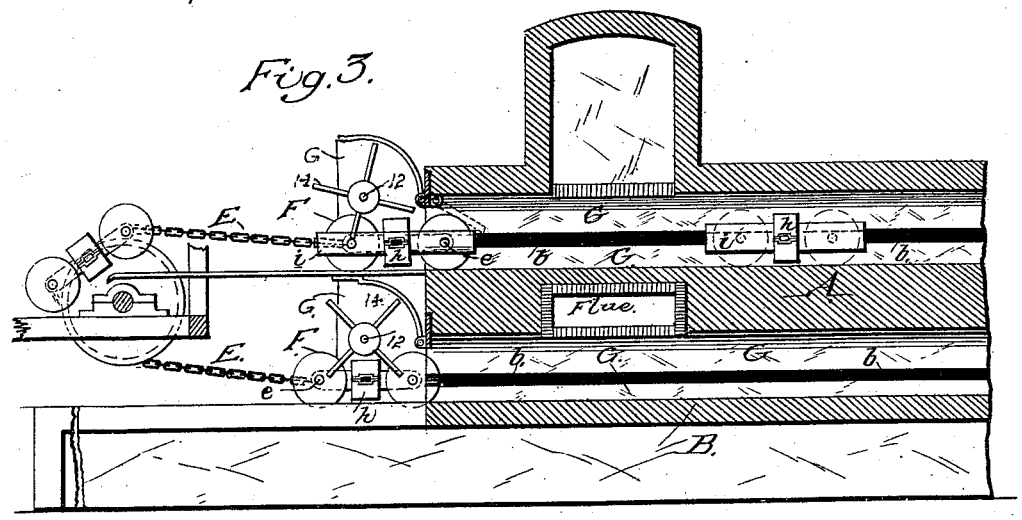
Figure 4:
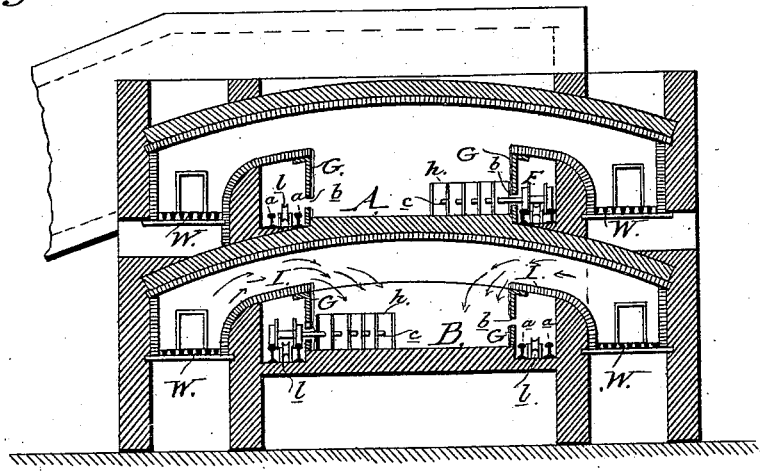
Figure 12:
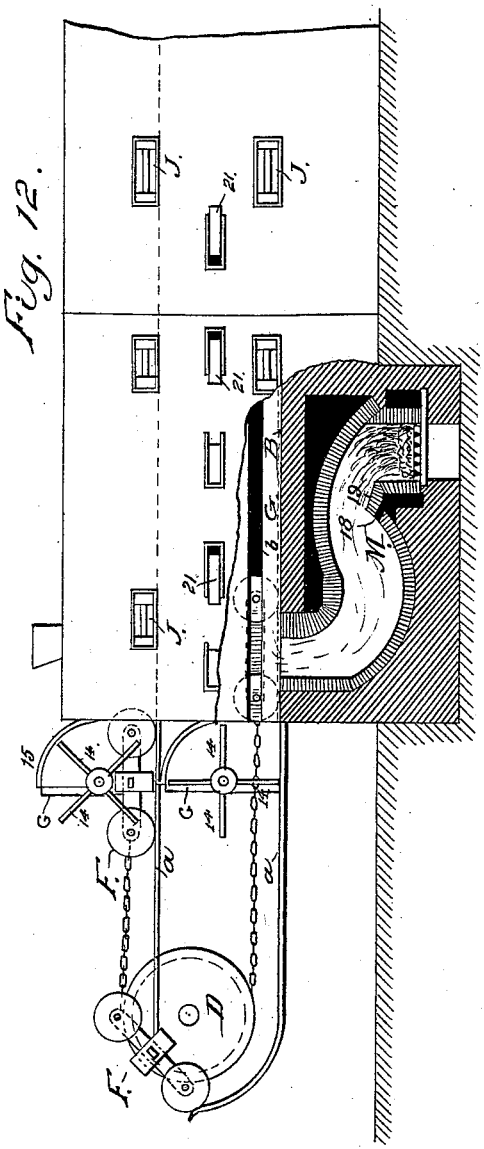
Figure 13:
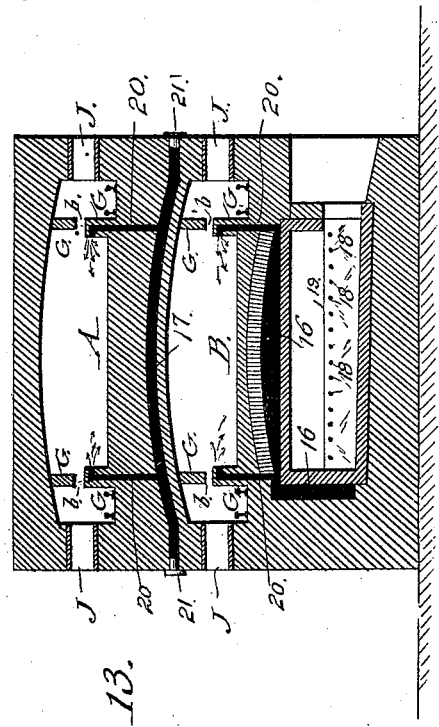

Figure 1 is a side elevation of an ore-roasting furnace embodying my invention. Fig. 2 is a horizontal sectional view of the same on the line $x\ x$ of Fig. 1, showing a portion of the upper hearth broken away to disclose the lower hearth. Fig. 3 is a central longitudinal sectional view through one end of the furnace. Fig. 4 is a cross-sectional view on the line $y\ y$ of Fig. 2. Fig. 5 is a longitudinal sectional view through one end of the furnace and showing the auxiliary hearth for slagging lead ores, &c. Fig. 6 is a cross-sectional view on the line $w\ w$ of Fig. 2. Fig. 7 is a detail showing a plan view, partially in section, of one of the carriages with its stirrers and adjunctive parts. Fig. 8 is a side elevation of Fig. 6. Fig. 9 is a detail showing one of the stirrers and the shield for protecting the wheeled carriages. Fig. 10 is an enlarged detail of one of the revolving doors, showing a portion of one end of the furnace. Fig. 11 is a front view of the same, partially in section. Fig. 12 is a part elevation and part section of a portion of the furnace, showing the hot-air passages. Fig. 13 is a cross-sectional view of the same on the line 2 2 of Fig. 12.

My invention relates to that class of horizontal furnaces having two separate longitudinal compartments forming hearths, one above the other, with connecting-passages between them and employing carriages drawn by chains or cables for gradually conveying the ore from the feeding to the discharge opening, one of said hearths being adapted for the desulphurization of the ore and the other for the chloridization; and my invention consists of the combinations and constructions of devices which I shall hereinafter fully describe and claim.

To enable others skilled in the art to which my invention appertains to make and use the same, I will now describe its construction and indicate the manner in which the same is carried out.

My furnace is constructed of the usual materials and is made with two separate hearths A B, one above the other, the upper hearth being designed for the desulphurization of the ore and the lower for the chloridization, both processes being performed at one operation.

The lower hearth is connected with the upper one by means of an opening C, whereby the ore is deposited from the upper compartment to the lower and is finally conveyed to the cooling-floor, as I shall hereinafter fully describe. Each hearth has one or more fire-boxes W communicating with it, and the furnace is provided with a flue X, Fig. 2, which leads to the main stack in the usual manner.

At each end of the furnace are mounted in any suitable manner pulleys or drums D, around which pass the chains E or analogous devices, to which wheeled carriages are attached, and provided with means for stirring and advancing the ore, as I shall hereinafter fully describe, and to a band-wheel D' on the shaft of one set of these pulleys or drums power is applied from any suitable source to operate the chains, said chains passing completely through the furnace, going in one way through the upper compartment and the other way through the lower compartment.

A serious objection to many of the furnaces of the type herein shown has been that the chains and their attachments were drawn through the center of the furnaces and were thereby exposed to the destroying action of the heat, dust, and fumes from the ore, and consequently these parts were soon destroyed.

A second objection arose from the fact that the plows or stirrers traveled against the floor of the compartment, which, being usually made of brick, would not only soon be cut in channels and worn out, but the plows or stirrers themselves would also be quickly worn away.

The essential part of my invention lies in constructing the furnaces so that these objectionable features are avoided and the moving or carrying parts protected from the direct action of the heat, fumes, and dust.

These objects are attained by the following constructions: Near the side of each compartment and extending the full length thereof are laid track-rails $a$ for the wheeled carriages F, (shown in Figs. 7 and 8,) to which the endless chains are connected in such manner that the carriages practically become links in the chains, and in order that these carriages may be removed from the direct action of the heat, fumes, and dust, I construct a vertical diaphragm, wall, or partition G between these parts and the hearth, so that the carriages move in a housing, where they are protected from the injurious action of the elements above mentioned, whereby the usefulness of these parts is greatly prolonged. This diaphragm wall or partition consists, preferably, of two vertically-disposed parts, one of which is secured to the hearth, while the other depends from the roof, and the adjacent ends of these parts are separated from each other by a space $b$, through which arms $c$ from the wheeled carriages project, and have fitted to them the devices for advancing and stirring the ore. These partitions, walls, or diaphragms G divide the upper and lower compartments into three chambers, the middle one being the hearth proper and the end ones being for the mechanisms by which the material is operated; but in the case of a very narrow furnace one of the partitions or diaphragms may be dispensed with, in which case but two chambers for each main compartment are necessary.

As before stated, the wheeled-carriers F are designed to run upon the track-rails in the supplemental compartment, and these carriers each consist of a suitable frame $d$, having end bosses or bearings 2, in which the shafts $e$, which carry the wheels $f$, are mounted, the ends of the frame being connected with the chain, substantially as shown in Fig. 7, whereby they assist in supporting the weight of the chains, while a series of wheels I, Fig. 4, placed between the rails at suitable points, assist in supporting the chains and prevent them dragging.

From one side of each frame $d$ entends an arm $c$, which projects through the slot or opening in the diaphragm or partition G, and has fitted to it a sleeve or casing $g$, to which the diagonally-disposed stirrers or blades $h$ are secured, the casing or frame having a plate or shield $i$ bolted to its inner side parallel with the frame $d$ and located just inside of the hearth to cut off the direct heat, fumes, and dust, and thereby close the contiguous portion of the slot or opening in the partition or diaphragm to protect and shield the carrier and its adjuncts and prevent the ore being crowded into the slot or opening. For ores that will oxidize at a low heat the stirrers are secured directly to the inwardly-projecting arm; but when working ores requiring a more intense and continued heat, I prefer to secure these stirrers to a sleeve or casing $g$, which is adapted to slip over the arm $c$, so as to completely incase the latter, and to this casing or sleeve the stirrers are secured. The opening in the sleeve or casing is somewhat greater than the diameter of the arm, and it is preferably lined with asbestus or other non-conducting material to prevent the arm becoming highly heated or affected by the fumes arising from the ores, and also to strengthen and make it more durable. The stirrers or blades $h$ may also be coated or covered with a non-conducting refractory substance, preferably asbestus cement, prepared for use in chemical works, after which the stirrers or blades are subjected to a strong heat to vitrify the cement and form a solid durable coating on the stirrers and casing or sleeve, which are thus made impervious to ordinary heat and the action of fumes and acids arising from the ores. The stirrers are designed to agitate and advance the ore along the hearth and to cause it to discharge through the openings made for its reception, as is common in this class of furnaces.

In addition to the features above mentioned, I have also modified the constructions of the furnace in the manner in which the heat is admitted, because when the fire is led directly to the furnace-hearth it impinges on the ore at one side and results in fusing and "caking" the ore to the great detriment of the work. My improvement in this connection consists in carrying the arches I over the supplemental compartments in which the wheeled carriers run, and thereby admitting all of the heat through the central portion of the roof or arch, so that it may impinge directly and evenly upon the top of the material. By this means the heat is distributed evenly, and there can be no caking or fusing of the ore, while at the same time the carriers and their operative mechanisms are fully protected against the injurious action of the fire.

In the sides of the furnace openings or doors J are made for the admission of air to the two supplemental compartments which contain the wheeled carriers and their adjuncts and finds its way through the slotted partitions or diaphragm to the upper and lower hearths in thin sheets, which is distributed directly upon the surface of the ore the entire length of the furnace. This stream of air being cooler than the heated gases with which the furnace is charged will diffuse itself evenly over the ore before becoming rarefied by the heat, and will thus furnish a greater amount of available oxygen than can be obtained in the usual manner and which greatly increases the efficiency of the furnace.

In treating lead ores, flue-dust, and other products that require partial fusing or slagging, I employ an auxiliary slagging-hearth M. (Shown in Fig. 5.) This auxiliary hearth is located under the roasting-hearth at the discharge end of the furnace, and the calcined ore is discharged through the flue or opening N by the stirrers. By means of the fire-box O an intense heat can be thrown upon the ore as it is on the slagging-hearth, and this ore, being already red-hot, is rapidly fused to any desired extent with no additional cost except raking it out in the form of slag, as the heat from the fire-box, passing into the main hearth through the flue or opening N, is utilized in desulphurizing the ores.

In constructing new furnaces the partition, wall, or diaphragm G can be made of brick or tiling; but in remodeling old furnaces this diaphragm may be made of metal plates coated with clay or asbestos, as shown in Figs. 4 and 6.

At the ends of the furnace the partitions or diaphragms are extended beyond the walls, and between these ends suitable revolving doors are mounted, so that they may close the ends of the hearths as tightly as possible against the ingress of outside air. These doors (see Figs. 10 and 11) each consist of end wings or plates 10, located at the ends of a hub or cylinder 11, mounted on a shaft 12, passing transversely through the extended ends of the diaphragm G and suitably journaled. The plates or wings 10 are formed with openings 13 in the central portions of their outer edges, and these openings are adapted to receive the arms $c$ of the wheeled carriers, whereby the passage of the latter causes a partial revolution of the doors. From the central hub or cylinder 11 radiate the arms 14, which form the doors proper, curved plates 15 serving to prevent the admission of air during the movement of the doors. As the wheeled carriers pass out of the ends of the furnace, their projecting arms $c$ strike the doors and cause the latter to turn about its journals, and as the nearest arm is moved away by the passage of the carrier the arm next above it is caused to close down behind the carrier and thereby close the end of the furnace, so as to shut out the air and leave this second arm in a position where the succeeding carrier may strike it and operate the door, as before described. By reason of this construction the doors are operated automatically by the passage of the wheeled carriers and the influx of air to the furnace is reduced to a minimum. The supplemental chambers are also provided with doors Z, and these doors are preferably pivotally hung from the shaft 12, so that they, too, may be lifted by the passing vehicle or carrier and afterward allowed to drop by gravity behind them to shut out the air from the supplemental chambers.

In roasting and chloridizing ores an abundant supply of free oxygen is a necessity, and to insure such a supply of oxygen without causing a cooling of the surface of the ore is an important factor in this class of furnaces, and to attain these results I form air spaces or passages 16 and 17 above and around the fire-boxes and in the arches, (see Figs. 12 and 13,) through which air may be discharged into the heating chambers or hearths in a heated condition.

In Fig. 12 the auxiliary slagging M is shown in section and the air passing around the fire-box becomes heated and is discharged through holes 18 in the bridge-wall 19, and thereby acts to consume the smoke by furnishing free oxygen to burn all unconsumed carbon. This greatly enhances the heat at this point and causes a more complete combustion of the fuel used. By means of the air duct or passage 17 in the arch between the hearths A and B air is heated and may be discharged through the ducts or passages 20 in the partitions or diaphragms G (see Fig. 13) into the body of ore on the hearths. The discharge in this case will be from the side, while in Fig. 4 the discharge is from above through openings in the arches.

I prefer to discharge the heated air into the supplemental chambers in all cases where a low heat can be used, but where a great heat is required the air is preferably discharged into the main chambers through the roof to avoid heating the wheeled carriers and adjunctive parts. The amount of air passing through the passage or duct in the arches is regulated by suitable doors 21.

Where brick or tiling is used to form the lower portion of the diaphragm or partition G, (see Fig. 13,) the heated air is brought up through the passages 20, formed in them, as shown. In building new furnaces this would be the preferable way; but in remodeling old furnaces, owing to the lack of space, the heated air may be introduced into the main chambers, as shown in Fig. 4.

Having thus described my invention, what I claim as new, and desire to secure by Letters Patent, is—

1. In an ore-roasting furnace having means for stirring and advancing the ore, a supplemental chamber at the side of the main roasting-chamber and cut off from said main chamber by a wall or partition, and carriers in said supplemental chambers connected with the stirrers, but removed from the direct action of the heat, fumes, and dust, substantially as herein described.

2. In an ore-roasting furnace having separate hearths, one above the other and adapted for the desulphurization and chloridization of the ore, separate supplemental compartments at the sides of the hearths separated from the latter by a slotted wall or partition, wheeled carriers in said supplemental chambers connected with stirrers in the main chambers or hearths, chains connected with the carriers, and means for operating the chains, substantially as herein described.

3. In an ore-roasting furnace having upper and lower hearths, movable vehicles at the sides of the hearths having stirrers connected with them and extending toward the center of the hearths, chains connected with said vehicles, and walls or partitions separating the vehicles and chains from the main chambers or hearths, whereby the former are not affected by the direct heat, fumes, and dust from said hearths, said walls or partitions having slots or openings in them for the passage of the stirrer-support, substantially as herein described.

4. In an ore-roasting furnace, a wheeled carrier adapted to travel within the same having a laterally-projecting arm to which the stirrers or blades are attached, and means for operating the carriers, substantially as herein described.

5. In an ore-roasting furnace having track-rails within it, the wheeled carriers adapted to travel upon said rails, arms projecting laterally from the frames of the carriers toward the center of the furnace, chains connected with the carriers, sleeves or casings fitted to the arms and provided with stirrers or blades, and means for operating the chains, substantially as herein described.

6. In an ore-roasting furnace, slotted walls or partitions extending longitudinally through the roasting hearth or chamber a short distance from the sides thereof to form supplemental chambers cut off from the direct heat, fumes, and dust of the main chambers, in combination with wheeled carriers in said supplemental chambers having arms projecting through the slots or openings thereof into the main chambers and provided with stirrers or blades, shields or plates on the carriers for closing the portions of the slots or openings contiguous to them, whereby the carriers are protected, and means for moving the carriers, substantially as herein described.

7. In an ore-roasting furnace, the stirrers or blades coated or covered with asbestus cement to form a vitrified surface impervious to ordinary heat and the action of the fumes and acids arising from the ore, substantially as herein described.

8. In an ore-roasting furnace, the stirrer-carriers having laterally-projecting arms and means for operating the carriers, in combination with sleeves or casings fitted to the arms and having an inner lining of asbestus, and stirrers or blades on the sleeves or blades, substantially as herein described.

9. In an ore-roasting furnace having side chambers cut off by a slotted wall or partition from the main chamber, the operating chains, the wheeled carriers in said side chambers let into the length of the chains to support the latter, the stirrers or blades supported from the carriers and extending through the slotted walls or partitions into the main chambers, and wheels or rollers on the floor of the supplemental chambers for assisting in supporting the chains, substantially as herein described.

10. An ore-roasting furnace having longitudinally-extending slotted walls or partitions along the sides of its main chamber to form supplemental chambers, movable carriers in said side chambers provided with means for stirring the ore, and openings in the sides of the furnace leading to the side chambers, whereby air is admitted in thin sheets to the main chambers through the side chambers and slotted walls or partitions, substantially as herein described.

11. In an ore-roasting furnace having upper and lower hearths for the desulphurization and chloridization of the ore and provided with longitudinally-extending walls or partitions forming supplemental side chambers, the roofs or arches of the hearths extending over and closing the tops of the side chambers and forming a centrally-disposed opening over the body of ore, fire-boxes having flues leading to said central openings, and carriers in the supplemental side chambers having stirrers extending into the main chambers for agitating and advancing the ore, substantially as herein described.

12. In an ore-roasting furnace, wheeled carriers adapted to travel within the furnace and provided with means for agitating and advancing the ore, in combination with housings at the ends of the furnace, and doors pivotally mounted in said housings and having radial arms, said carriers provided with means for actuating the doors in the passage to impart a partial revolution and to bring the arms successively into position to close the entrance to the furnace-chambers, substantially as herein described.

13. In an ore-roasting furnace, the combination of the roasting-chambers and connecting passages, the slotted partitions in said chambers forming supplemental side chambers and extending beyond the ends of the furnace to form housings, shafts journaled in the housings, doors pivotally mounted on said shafts at the ends of the main and supplemental chambers, and carriers in the side chambers supporting stirrers arranged in the main chambers adapted to travel through the furnace and actuate the doors in their passage, substantially as herein described.

14. In an ore-roasting furnace, the combination of the main roasting-chambers, the slotted partitions therein forming side chambers, carriers in the side chambers provided with means for stirring the ore in the main chambers, a fire-box having a surrounding air-space, an air-space below the upper main chamber provided with means for regulating the flow of air, and branch passages leading from the air-spaces upward through the slotted partitions and discharging into the main chambers, substantially as herein described.

HORACE F. BROWN.

Witnesses:
M. C. BROWN,
C. N. BROWN.